US009327784B2

(12) United States Patent
Bagheri et al.

(10) Patent No.: US 9,327,784 B2
(45) Date of Patent: May 3, 2016

(54) CLIMBING ROBOT FOR MASTS (71) Applicants: Mohsen Bagheri, Aachen (DE); Peter Dahmann, Aachen (DE)

(72) Inventors: Mohsen Bagheri, Aachen (DE); Peter Dahmann, Aachen (DE)

(73) Assignee: FACHHOCHSCHULE AACHEN, Aachen (DE)

( * ) Notice: Subject to any disclaimer, the term of this patent is extended or adjusted under 35 U.S.C. 154(b) by 0 days.

(21) Appl. No.: 14/374,944

(22) PCT Filed: Jan. 30, 2013

(86) PCT No.: PCT/EP2013/000270
§ 371 (c)(1),
(2) Date: Jul. 28, 2014

(87) PCT Pub. No.: WO2013/113494
PCT Pub. Date: Aug. 8, 2013

(65) Prior Publication Data
US 2015/0090504 A1    Apr. 2, 2015

(30) Foreign Application Priority Data

Jan. 31, 2012   (DE) .................. 10 2012 001 725

(51) Int. Cl.
| F16L 3/08 | (2006.01) |
| F16L 3/12 | (2006.01) |
| B62D 57/00 | (2006.01) |
| B62D 57/024 | (2006.01) |
| E04G 3/24 | (2006.01) |
| E04G 3/28 | (2006.01) |
| F03D 1/00 | (2006.01) |
| F03D 11/00 | (2006.01) |

(52) U.S. Cl.
CPC .............. *B62D 57/024* (2013.01); *E04G 3/243* (2013.01); *E04G 3/28* (2013.01); *F03D 1/003* (2013.01); *F03D 11/0091* (2013.01); *F05B 2230/80* (2013.01); *F05B 2240/912* (2013.01); *Y02E 10/728* (2013.01); *Y02P 70/523* (2015.11)

(58) Field of Classification Search
CPC ... B62D 57/00; B62D 57/024; F03D 11/0091
See application file for complete search history.

(56) References Cited

U.S. PATENT DOCUMENTS

| 350,289 A | 10/1886 | Brown |
| 2,906,365 A | 9/1959 | Howard |
| 3,586,127 A | 6/1971 | Jones |

(Continued)

FOREIGN PATENT DOCUMENTS

| DE | 19909698 A | 4/2000 |
| DE | 102005016931 B | 5/2006 |
| DE | 202005053782 A | 6/2006 |

*Primary Examiner* — Tony Winner
(74) *Attorney, Agent, or Firm* — Andrew Wilford (57) ABSTRACT A mast-climbing robot has first and load-bearing assemblies, at least one linear actuator connected between the assemblies for changing their vertical spacing, and a respective clamp on each load-bearing assembly that can secure the respective load-bearing assembly on the mast and release the respective load-bearing assembly therefrom. Each clamp has two bearing points on the respective load-bearing assembly, at least one flexible belt that extends between the two bearing or attachment points and circumferentially around the mast, and at least one clamping actuator with which the length of the at least one belt can be increased and decreased between the bearing or attachment points to tighten lock the respective belt about the mast and thereby lock the respective assembly on the mast.

21 Claims, 8 Drawing Sheets

(56) References Cited

U.S. PATENT DOCUMENTS

| | | | |
|---|---|---|---|
| 4,893,512 A * | 1/1990 | Tanimoto | F22B 37/006 73/622 |
| 8,201,787 B2 | 6/2012 | Ingram | |
| 8,944,192 B2 * | 2/2015 | Nance | B62D 57/024 180/7.1 |
| 2011/0031066 A1 | 2/2011 | Liu | |
| 2011/0100734 A1 * | 5/2011 | Fauroux | B62D 57/024 180/8.7 |
| 2012/0103705 A1 * | 5/2012 | Schlee | B25J 5/007 180/14.1 |
| 2013/0140801 A1 * | 6/2013 | Schlee | B62D 57/024 280/762 |

* cited by examiner

CLIMBING ROBOT FOR MASTS

CROSS REFERENCE TO RELATED APPLICATIONS

This application is the US-national stage of PCT application PCT/EP2013/000270 filed 30 Jan. 2013 and claiming the priority of German patent application 102012001725.1 itself filed 31 Jan. 2012.

FIELD OF THE INVENTION

The invention relates to a mast-climbing robot, particularly for wind turbines, comprising at least one first load-bearing assembly and at least one second load-bearing assembly, where a vertical spacing between the load-bearing assemblies can be changed by at least one linear actuator and each load-bearing assembly comprises a respective clamp that can firmly grip the mast and slide on the mast.

The invention further relates to a mobile maintenance dock that can be fixed to a mast-climbing robot.

BACKGROUND OF THE INVENTION

A climbing robot of this generic type can be used, for example, in wind turbines in order to climb up and down the mast (also referred to as a tower), for example for maintenance-related purposes. According to the invention, however, the application is not limited to wind turbines and their masts. Rather, a climbing robot according to the invention can climb any mast, regardless of what is supported by the mast and what type of mast it is.

The maintenance dock, which will be described further below, can also be used in one possible application in order to perform maintenance on wind turbines, particularly on their rotor blades. Here as well, however, the application is not limited to wind turbines. Rather, any device, particularly any device supported by masts, can be maintained by a maintenance dock as described below.

Insofar as the application of the invention is described in the following with respect to a climbing robot and maintenance dock using the example of a wind turbine, this must not be understood as a limitation, but rather only as an example of one possible application among many possible ones.

Wind turbines have become an important component of our power supply. Like all other technologies (for example aviation, astronautics, automobile, etc.), wind-power technology is subject to certain regulations with respect to development, production, operation and maintenance.

Such regulations place special emphasis on safe operation and safe maintenance. Particularly noteworthy in this context are the periodic inspections of the rotor blades and of the wind towers (masts). The same or similar requirements also apply to other types of systems. To enable these inspections to be conducted, the industry needs certain systems that meet all of the requirements ranging from functional safety to the of maintenance as a complete solution.

The demand for economy and technology entails performing as many work steps as possible in a single operation at the site of operation in a cost-effective, fast, precise and safe manner. To this end, the tools required for this today have not been suitable for such on-site use. Our aim with this solution is to meet precisely these requirements with this climbing robot.

The requirement of the periodic inspection of the rotor blades is not limited merely to remedying visible damage, but rather to recognize, evaluate and remedy, as needed, all structural changes such as cracks or delamination under the (paint) surface as well so that safe operation can be ensured until the next inspection. In order to fulfill these requirements, work conditions must be created that enable the use of suitable testing and repair methods (NDT, ZFP etc.). In doing so, it is important to create work conditions on the wind turbines that enable the many work steps that are currently carried out in a repair workshop to be carried out on site in an expedient manner independently of the weather conditions.

Today, it is possible neither to perform Non-Destructive Testing (NDT) nor a rotor blade repair completely on the wind turbine. However, in order to deal with the cost pressure of the operators of wind turbines within an economically efficient range, it is essential to minimize down time. That can only be achieved with a comprehensive solution for inspection and repair on the wind turbines.

However, the periodically required inspection of rotor blades or of wind power towers per DIN EN 61400-23 (VDE 0127-23) requires a complete examination of the rotor for additional damage that may occur as a result of production or dynamic loading and oftentimes through operational vibration. Performing NDT on the rotor blade turns out to be quite difficult but, as described in the dissertation of Dr.-Dipl.-Geophys. Anne Jüngert, there are possibilities for performing NDT on the blade.

A climbing robot of the generic type cited at the outset is known, for example, from the publication DE 10 2005 053 782. The clamp is formed here by traverses that can be moved opposite each other and pressed with their clamping brackets or jaws at several places against the mast surface in order to generate adhesive forces between climbing robot and mast.

It must be viewed as a drawback here that the climbing robot can only be used in areas in which there are certain prescribed mast diameters and would otherwise have to have its dimensions reworked, and that the retaining forces are applied in this case with only four clamping brackets or jaws arranged around the periphery of a mast.

OBJECTS OF THE INVENTION

It is the object of the invention to provide a climbing robot that has a high degree of versatility, a high level of safety and stability and that can be used on a great number of different masts or towers.

It is also the object of the invention to provide a mobile maintenance dock in order to offer, in connection with the climbing robot according to the invention, as many work steps of maintenance as possible in one operation and, particularly, independently of the weather.

SUMMARY OF THE INVENTION

The object is achieved according to the invention with a climbing robot of the type described above in which, furthermore, at least part of the clamps, preferably every one of the clamps comprises at least one belt that extends between two bearing or attachment points arranged on the load-bearing assembly and can engage flexibly circumferentially around a mast or tower and comprises at least one clamping actuator with which the length of the at least one belt can be increased and decreased between bearing or attachment points.

In designing a climbing robot, it is essential that the retaining forces are not applied only in a "pointwise" manner with a few pairs of clamping brackets or jaws on the outer surface of a mast or of a tower, but rather that the forces are applied over a substantial portion of the entire periphery, which is achieved by circumferentially placing flexible belts, which is to say movable in a bendable or articulated manner, around the mast or tower. Accordingly, due to the flexibility, a belt of a clamp according to the invention bears against the outer surface of a mast or tower.

This also offers the advantage that a climbing robot according to the invention does not have to be adapted to the specific cross-sectional shape of the mast or tower, because such an adaptation occurs automatically in each individual case as a result of the flexibility of the belts. As a result, it is also easily possible to climb masts whose cross section changes along its extension, i.e. tapered, and whose diameter thus changes.

The cross section inherent to the mast or tower enclosed during climbing by a climbing robot according to the invention is conformed to by the respective belts and the load-bearing assemblies. The load-bearing assemblies are pulled into a gripping position against the mast or tower outer surface, and a belt continues to be engaged around the mast or tower starting from a hinging or attachment point on a load-bearing assembly and is guided again to the load-bearing assembly on a hinging or attachment point.

Accordingly, the majority of the cross section enclosed by the load-bearing assembly and belts is formed by the belt, so that the acting forces for retaining are applied by substantially larger surfaces to the mast or tower than in the prior art. Here, the acting surface is determined by the height of a belt and the length of the contact between belt and mast or tower surface, as well as the area on which a respective load-bearing assembly is bearing. The static friction is thus increased significantly compared to the prior art.

The clamping of a load-bearing assembly of the climbing robot can be achieved by shortening the length of one or more belts with a clamping actuator, particularly the effectively acting length of a belt between the hinging or attachment points, particularly so that, as a result, the inner surface of a respective belt facing toward the tower or mast is pulled against the outer surface of the tower or mast and comes into contact with same. Preferably, the required retaining forces are predominantly applied accordingly through direct contact between the belt and the outer surface.

In a load-bearing assembly in which the at least one clamping actuator lies outside of the load-bearing assembly, which is to say that it is not housed, for example, such an above-mentioned hinging or attachment point can be formed, for example, directly by an actuator or a portion thereof, for example by a winding roller, a guide roller, or the like.

In a preferred embodiment, at least one clamping actuator is provided inside the load-bearing assembly. The load-bearing assembly can thus constitute the housing of the at least one clamping actuator or comprise such a housing. Two ports are then provided where each belt enters or exits the load-bearing assembly. The respective belt extends through the ports into the interior of the load-bearing assembly and is tensioned or released or relieved in the interior by the at least one clamping actuator. With the at least one clamping actuator, the length of the belt lying outside of the load-bearing assembly can thus be increased or decreased. A hinge point can lie inside the load-bearing assembly behind such a port. The port can be formed by a sliding sleeve through which a belt can slide, optionally even in a contact-free manner.

The basic climbing function is achieved as follows: A load-bearing assembly is locked by the respective clamp to the mast or tower, particularly by reduction of the length of the at least one belt. The load-bearing assembly that is not clamped, which is to say the one that is loose with respect to the mast or tower, is moved by at least one linear actuator in the desired direction of movement, i.e., up or down. After this movement, the just-moved load-bearing assembly is clamped and the previously clamped load-bearing assembly is released. The load-bearing assembly that was just released can then be moved in the desired direction of movement by the respective linear actuator. This results in a kind of stepping actuator in which the load-bearing assemblies are alternatingly clamped, released and moved linearly.

The linear movement can be achieved by at least one linear actuator, with which the vertical spacing between the load-bearing assemblies, particularly a minimum and maximum position, can be changed. For example, such an actuator can be a threaded spindle that is rotated by a motor in one load-bearing assembly and the other load-bearing assembly is attached to a nut running on the spindle. Such a spindle can preferably be self-locking. The actuator can also be a hydraulic or pneumatic cylinder/piston assembly that is alternatingly pressurized and released. Rack and pinion actuators are also possible, as well as other actuator designs that linearly and vertically move the load-bearing assemblies.

In a simplest of embodiments, a belt of a load-bearing assembly is fixed at one end or region to the load-bearing assembly and the other end or another region is loosely attached, i.e., an actuator acts or engages on this loose end or to build up or release tension in it. This structurally simple design merely has the drawback that the climbing robot moves around the mast or tower during clamping and releasing. This could be compensated for over the sum of all clamping and releasing actions if the belts of the different load-bearing assemblies are fixed at different sides and the two load-bearing assemblies move around in opposite directions. Compensation could also be achieved if two belts are provided in the clamp on one load-bearing assembly that have their stationary and moveable ends on opposite sides.

In a particularly preferred embodiment, a belt has two belt regions or ends, particularly inside a load-bearing assembly, that are acted upon by a common actuator, particularly by a pulling or pushing or winding and unwinding of the belt. Here, each belt of a load-bearing assembly can have its own actuator or actuators; however, when there are several belts on a load-bearing assembly, all of the belts have one actuator or all of the belts have common actuators on their belt ends or parts lying on the same side.

In the above-mentioned embodiments, in which both belt regions or belt ends of a belt are driven, tension can be generated or released simultaneously at both ends. This prevents the climbing robot from moving around the mast or tower.

The climbing robot can also be made to move around intentionally, however, if only one region or end is actuated during a current clamping or releasing step, even though both regions or ends could be actuated in principle.

If the belt ends or regions are moved by a common actuator, this can be achieved, for example, with a switchable coupling with which it can be set using a control whether the common actuator acts on one or the other of the two belt regions or ends or on both simultaneously.

In contrast, if separate actuators are used for the belt ends or regions, only one of the actuators can be controlled in order to bring about movement around the mast; otherwise, both of the actuators operate synchronously.

The actuators can drive toothed wheels, for example, whose teeth engage in recesses of the belts in order to apply pulling or pushing forces, thus bringing about a clamping or releasing.

One structurally simple embodiment is achieved if at least one winding roller is actuated with the at least one clamping actuator, and the respective belt is wound onto it in order to produce tension or unwound in order to release it.

In one embodiment, when a belt has two actuated belt ends, both belt ends can be wound onto and off a common winding roller. A separate winding roller can also be provided for each belt end, particularly if the two winding rollers have a common clamping actuator or common clamping actuators, as mentioned previously.

In a preferred development, particularly of the embodiments with winding rollers, the belt is deflected lengthwise at a respective deflection point before the belt region or the belt end on which the at least one actuator is acting, particularly inside the load-bearing assembly. A guide roller can be used, for example, for this deflection.

This embodiment offers the advantage that a shorter spacing can be implemented between two guide rollers associated with the respective belt regions or ends, particularly a shorter spacing in the circumferential direction of the mast or tower, than between the winding rollers or other actuator elements for clamping or releasing.

The cross section enclosed by a belt between the deflection points is greater than 300°, preferably greater than 330°. This way, a belt can therefore rest against the periphery of a mast or tower over a greater length.

In order to achieve a secure and defined abutment of a respective load-bearing assembly on its side facing toward a mast or tower when clamped, each load-bearing assembly has at least two circumferentially spaced bearing elements by means of which it can be supported during a clamping action on the outer mast or tower surface. These bearing elements can, for example, have grip faces that can engage radially inward against the mast or tower surface, for example. The grip faces can also be curved, for example formed as a part-cylindrical surface.

In one development, each of the bearing elements can be moved radially inward against the mast or tower surface and out, particularly that all of them can be moved simultaneously. For this movement capability, the bearing elements can have at least one actuator, such as a common actuator, or they can also have separate actuators with which the bearing elements can be moved from a load-bearing assembly in the direction toward the mast or tower and retracted.

For example, when a load-bearing assembly is released from the tower or mast in order to move it with the at least one linear actuator in the vertical direction, it can be pulled away from the mast or tower surface before the movement with the at least one actuator of the bearing elements, so that a load-bearing assembly is disengaged from the mast or tower during its vertical movement. Before or during clamping, the bearing element can then be engaged on the surface of the mast or tower by movement toward it.

In a combination of the modified embodiments, the circumferential spacing of the bearing elements is greater than the spacing of the deflection points of the belt.

In a preferred development that can be combined with any of the preceding embodiments, two belts of different load-bearing assemblies can be connected by controllable linear actuators that can be changed in length, particularly on a side of a mast or tower facing away from the load-bearing assemblies. A belt of a currently unclamped load-bearing assembly can thus be secured against sliding downward on the mast or tower in the direction of gravity, since it is also fastened via the linear actuator that is changeable in length to a belt that is currently clamped and hence fixed on the mast or tower.

If the released load-bearing assembly shifts vertically by actuating the linear actuator connecting the load-bearing assemblies, then the linear actuators connecting the belt or belts of the other load-bearing assemblies can also be actuated simultaneously, so that they change in length synchronously with respect to each other and to the at least one linear actuator of the load-bearing assemblies, which is to say their lengths decrease or increase depending on the direction of movement. In this way, even the belt regions that are farthest removed from the load-bearing assemblies are supported against gravity and moved along in the direction of movement of the loose load-bearing assembly.

Moreover, at least one trolley or sliding carriage is mounted on the belt, particularly several dollies or sliding carriages be distributed over the periphery with which a belt can be lifted from the mast or tower surface upon release of the clamping. Such a lifting-off of a region of a belt in which such a carriage is arranged can be achieved, for example, by a constant force load that pulls the belt radially to the carriage when the clamping action of the belt is released. A released and lifted-off belt can then be moved more easily along the mast or tower, it being preferred that only the carriage rolls or slides on the mast or tower surface.

A trolley or sliding carriage can, for example, have an element that bridges over a belt in the vertical direction that can be or is engaged with both of its ends on a mast or tower surface by rollers or slide blocks arranged on the latter, with the side of the bridge element facing toward the mast or tower being connected to the belt by a tension spring. This connection can be produced, for example, by a sleeve to which the tension spring is attached and in which the belt is arranged.

The climbing function of a climbing robot according to the invention is already ensured if two load-bearing assemblies are arranged over one another in the vertical direction. A more stable arrangement can be achieved if the two load-bearing assemblies are arranged so as to be interlaced with each other.

This can be achieved, for example, by providing at least one of the two load-bearing assemblies with at least two parts vertically spaced with respect to each other and connected to each other, with each of the parts having at least one clamp, and with the other of the two load-bearing assemblies being arranged between two such parts completely or with at least one of several load-bearing assembly parts spaced apart from each other in the vertical direction and connected to each other.

For example, two load-bearing assembly parts of one of the load-bearing assemblies can be connected to each other by vertical rails on which the other load-bearing assembly or one of several load-bearing assembly parts of the other load-bearing assembly is guided.

The belt that can be used here can be embodied, for example, as a link belt with several belt members that are connected to each other so as to swivel about a vertical axis, or, for example, also as a chain or as a flat belt made of a metal or fiber plastic composite or, especially preferably, as a textile band, particularly a belt.

A textile belt offers the advantage that, as a result of the weaving of the individual belt fibers, flexibility is achieved not only in the circumferential direction, but also in the vertical direction. Such a textile belt can therefore lie especially well against masts or towers that have a conical shape in the vertical direction, since another circumferential length contacting the mast or tower can adapt without difficulty to a textile belt around the lower circumferential region, i.e. on the upper region. A textile belt therefore adapts without difficulty to taper. This is especially advantageous in wind turbines, which usually have frustoconically tapered towers.

Furthermore, the object of the invention described above is also achieved by a mobile maintenance dock with at least one support beam that can be attached to a mast-climbing robots, particularly to a climbing robot of the previously described type, and with at least one dock shell that is attached to the at least one support beam such that it can be moved in at least one, particularly in at least two, preferably mutually perpendicular directions.

Such a maintenance dock can be fastened with the at least one beam to a climbing robot and raised, thus enabling maintenance work to be performed in the dock that could otherwise only be performed in a stationary workshop. The at least one dock shell provides protection from wind and weather.

In wind turbines, for example, the at least one dock shell can, due to its movability, be moved toward a rotor blade. For example, the dock shell can be dimensioned such that the surface of the rotor blade closes the dock shell. This is facilitated especially well if the at least one dock shell is attached to the at least one support beam so as to be moveable in three mutually perpendicular directions.

The at least one dock shell can preferably be modified such that it is cut away at two ends vertically spaced from each other. A vertically hanging wind turbine rotor blade can be received especially well in these cutouts; after which the dock shell is moved toward the rotor blade. Such cutouts can be adapted in its contour, when viewed from above or below, to the aerodynamic profile of a rotor blade.

Independently of the above-described embodiment, but also combinable with it, at least one seal element can be arranged at the ends of the cutout that can rest in a sealing manner against the contour of a maintenance object, such as a wind turbine rotor blade. To facilitate this, the at least one seal element can, for example, be slidably mounted, for example on telescoping actuators. The seal element can thus be pushed against the contour. The seal element can be pumped up. For example, it can be for this purpose a hollow member that can be pumped up with a fluid, particularly a hose element. As a result of being pumped up, it can adapt positively to a wind turbine rotor blade contour or also to the contour of another maintenance object and seal the dock from the influence of weather and wind. Provision can also be made to combine mobility and inflatability.

One preferred embodiment of the mobile maintenance dock, which can be combined with all of the previously mentioned embodiments, is that it has two dock shells, particularly identically shaped dock shells, that have openings that face each other horizontally, with at least one of the dock shells, preferably both dock shells, being fastened to at least one support beam so as to be moveable in at least two directions.

The two docks can thus complement each other to form a complete dock when moved together, thus enclosing a maintenance object that passes through them, for example, in the case of a wind turbine rotor blade. In such an embodiment, the opening of a dock shell can also be larger than a wind turbine rotor blade, since the dock shell need not absolutely be closed already by the rotor blade, but rather this weather-tight closing can also be achieved later by the second dock shell. Here, too, the recesses in both dock shells and hence the cross section remaining between the dock shells and the enclosed rotor can be closed by inflatable hollow elements.

In at least one of the dock shells, a robot arm moveable on multiple axes can be provided in order to perform maintenance work or inspections. Such a robot arm can be moved along the surface of the maintenance object, particularly of a wind turbine rotor blade, by a rail system that is located on the inner periphery of the at least one dock shell. Rail systems that are inside both dock shells can be coupled to each other by moving the shells together, so that a robot arm or also another maintenance device guided on the rail system can be moved from one dock shell to the other.

BRIEF DESCRIPTION OF THE DRAWING

Embodiments of the invention are described below with reference to the drawing in which.

SPECIFIC DESCRIPTION OF THE INVENTION

Figures 1, 2:
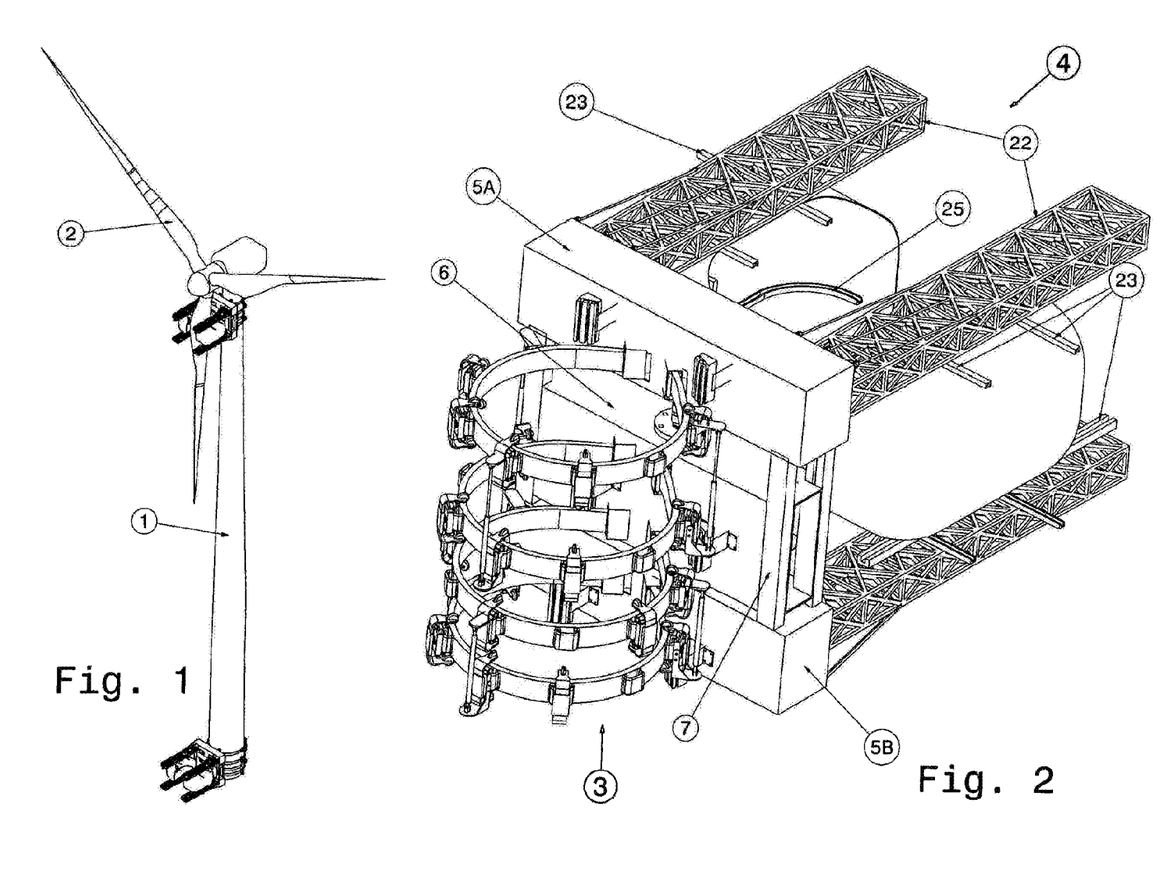
FIG. 1 shows a wind turbine with a climbing robot according to the invention and a mobile maintenance dock according to the invention attached thereto.
FIG. 2 is a top view of the climbing robot with maintenance dock.

FIG. 1 shows an overview of the possible application of a climbing robot according to the invention and a maintenance dock according to the invention attached thereto in a wind turbine with a mast or tower 1 on which the climbing robot can step, which is to say climb up or down discontinuously, for example in order to perform maintenance work on a rotor blade 2.

Figure 3:
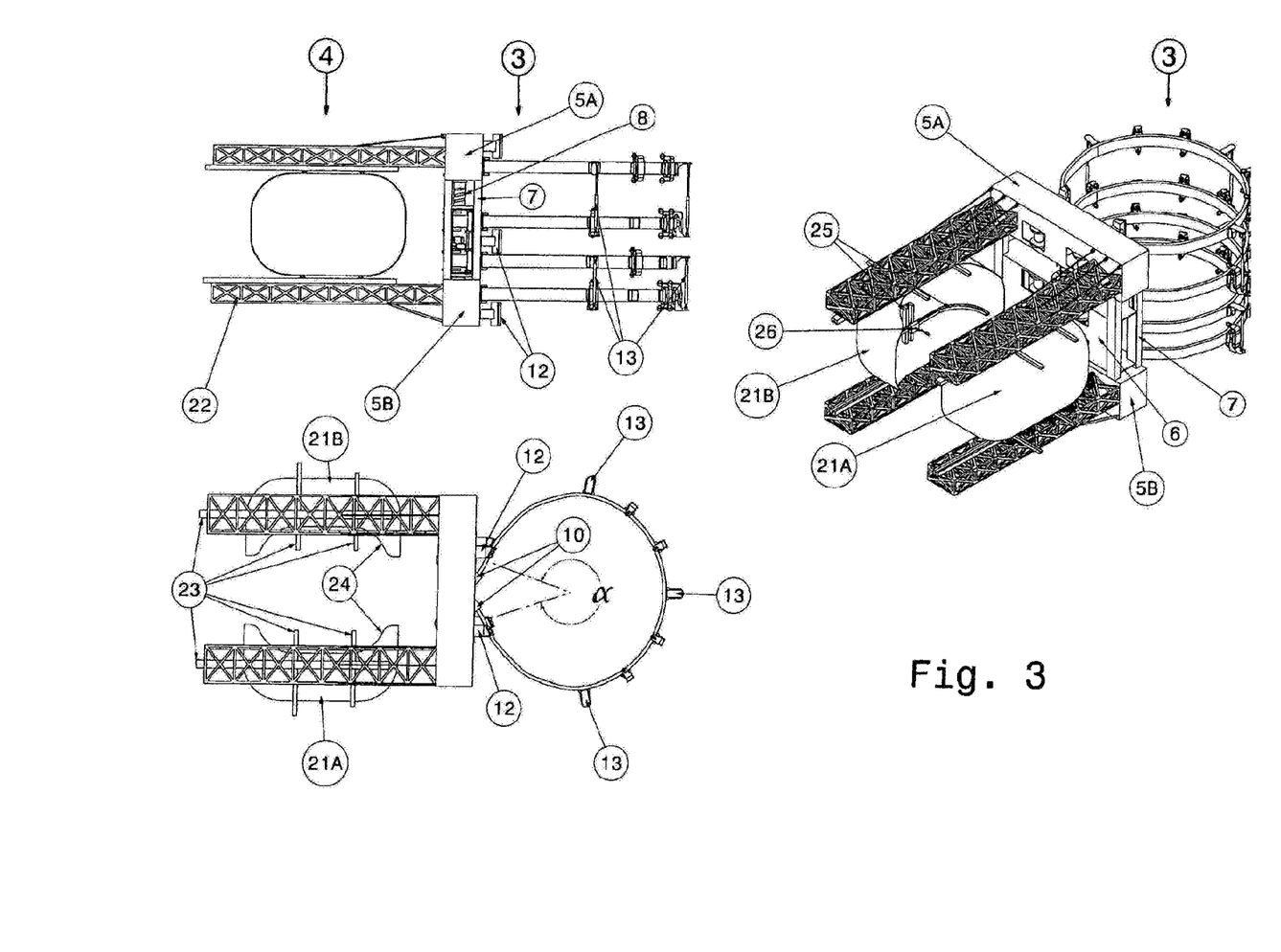
FIG. 3 has several views of the climbing robot with maintenance dock.

FIGS. 2 and 3 show the climbing robot 3 and the maintenance dock 4 in greater detail.

Figure 4:
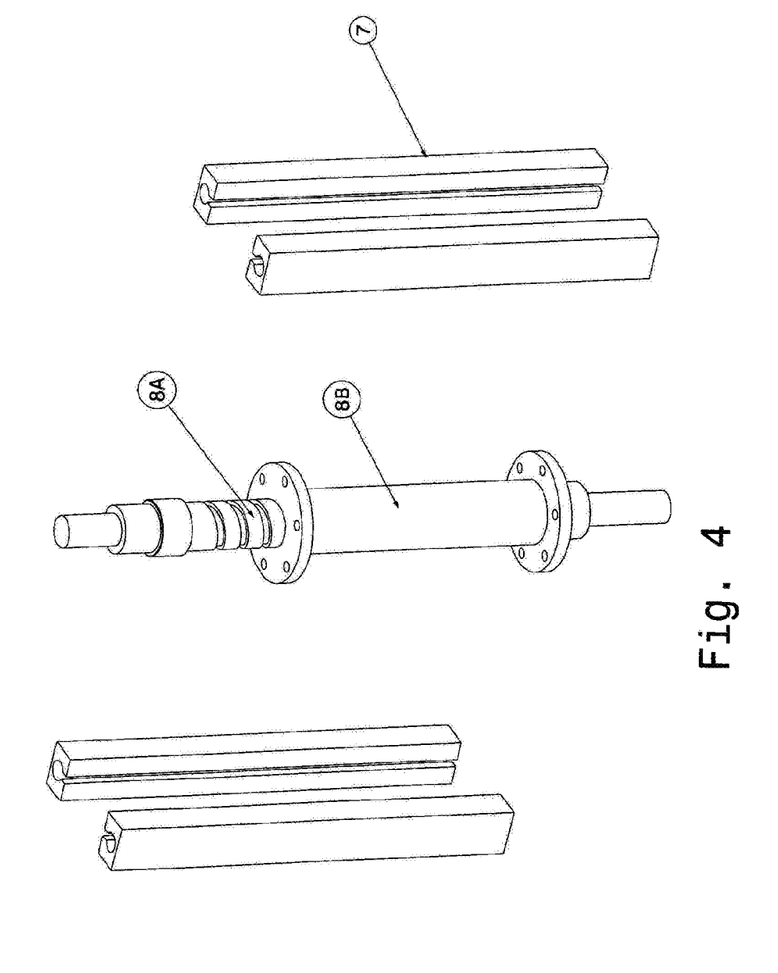
FIG. 4 shows the linear actuator of the load-bearing assemblies.

The climbing robot 3 comprises a first load-bearing assembly 5 and a second load-bearing assembly 6. The first load-bearing assembly 5 is subdivided into two load-bearing assembly parts 5A and 5B that are vertically spaced and connected by guide rails 7 on which the load-bearing assembly 6 can be moved up and down between the load-bearing assembly parts 5A and 5B by a linear actuator 8. This linear actuator 8 is shown in greater detail in FIG. 4 and comprises a spindle 8A that can be rotated by a motor attached at both ends of the load-bearing assembly 5. The spindle bears a nut 8B that is connected to the load-bearing assembly 6. Motorized rotation of the spindle shifts the nut and load-bearing assembly 6 between two end positions. The load-bearing assembly 6 is guided in or on the vertical rails 7 that connect the two load-bearing assembly parts of the load-bearing assembly 5 between their confronting edges.

The load-bearing assembly 5 comprises two clamps consisting of several components, with a clamp being arranged on the upper load-bearing assembly part 5A and one being arranged on the lower load-bearing assembly part 5B. The load-bearing assembly 6 also has two clamps.

Figure 5:
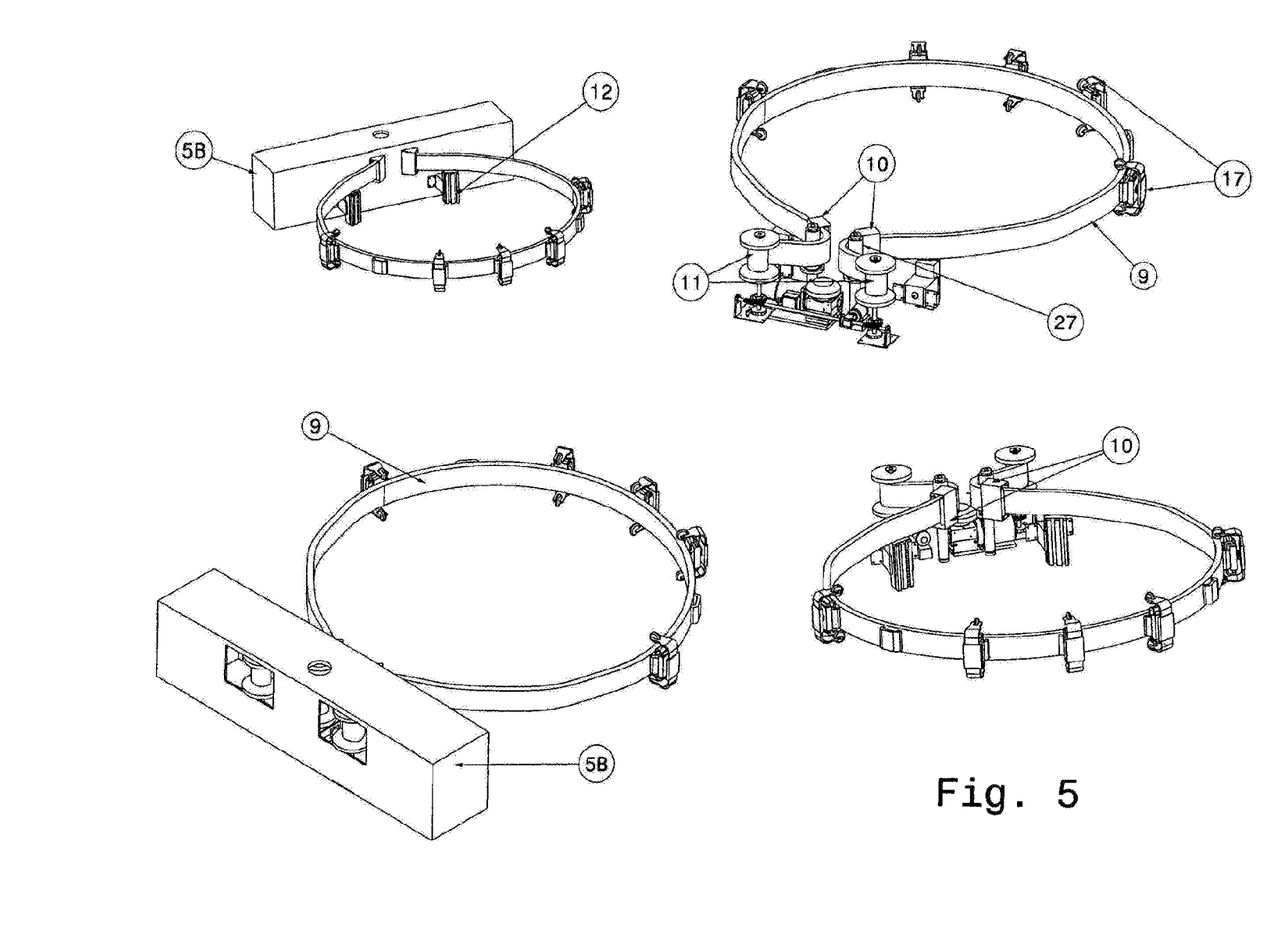
FIG. 5 shows a clamp of one of the two load-bearing assembly parts.
Figure 6:
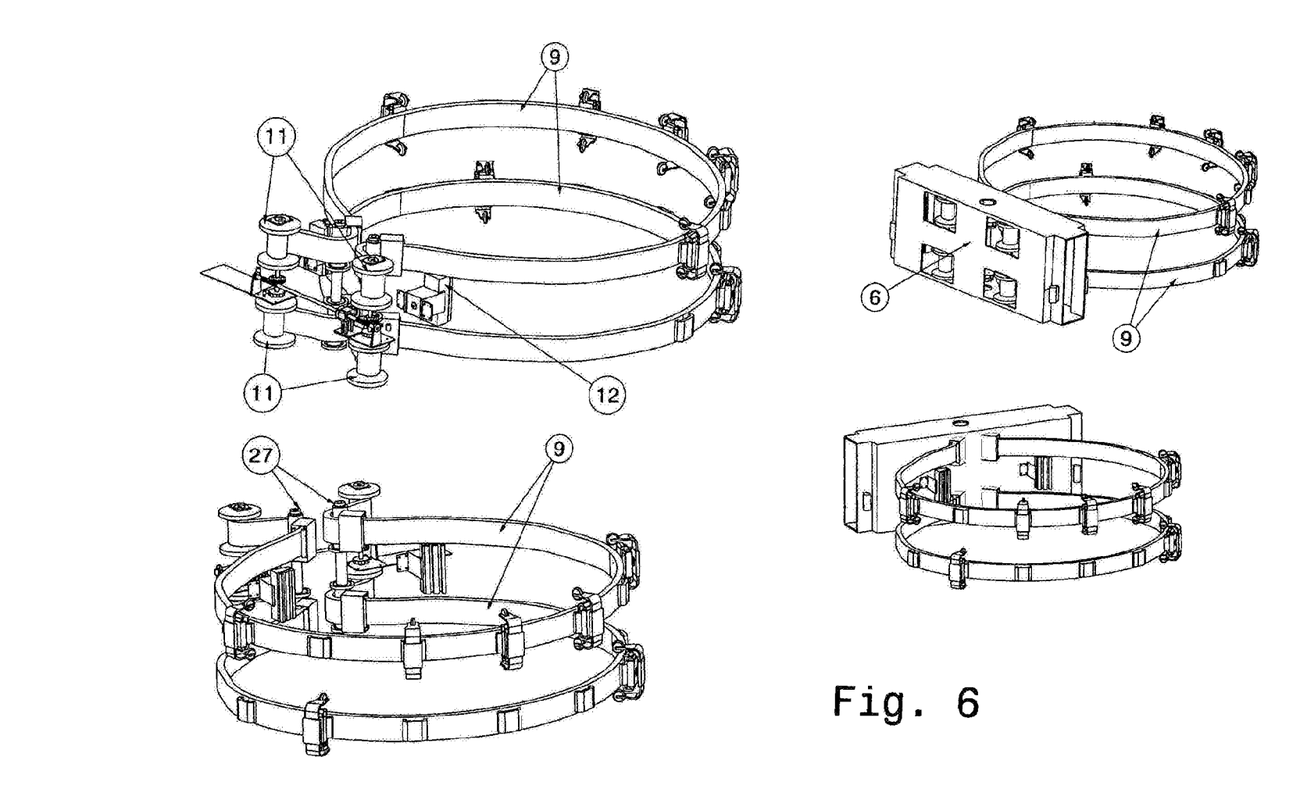
FIG. 6 shows the clamp of the other load-bearing assembly.

According to FIGS. 5 and 6, each clamp comprises a belt 9. Each belt can—as shown in FIG. 1—engage around the outer periphery of a mast 1 and bears against same at least in the gripping position. In order to tension or release tension, the ends of each belt 9 are guided through recesses and slide sleeves 10 therein into the interior of a load-bearing assembly 5 or 6, and each end is wound onto or unwound from its own winding roller 11.

A respective deflecting roller 27 shifts the belt 9 lengthwise between each sliding sleeve 10 and winding roller 11. The deflecting rollers are spaced more closely than the winding rollers. Despite the large winding rollers 11 and the components required to actuate them, each belt can bear against the circumference of a mast 1 over an angle α>300° as shown in FIG. 3. This results in an especially large load transmission surface.

Figure 8:
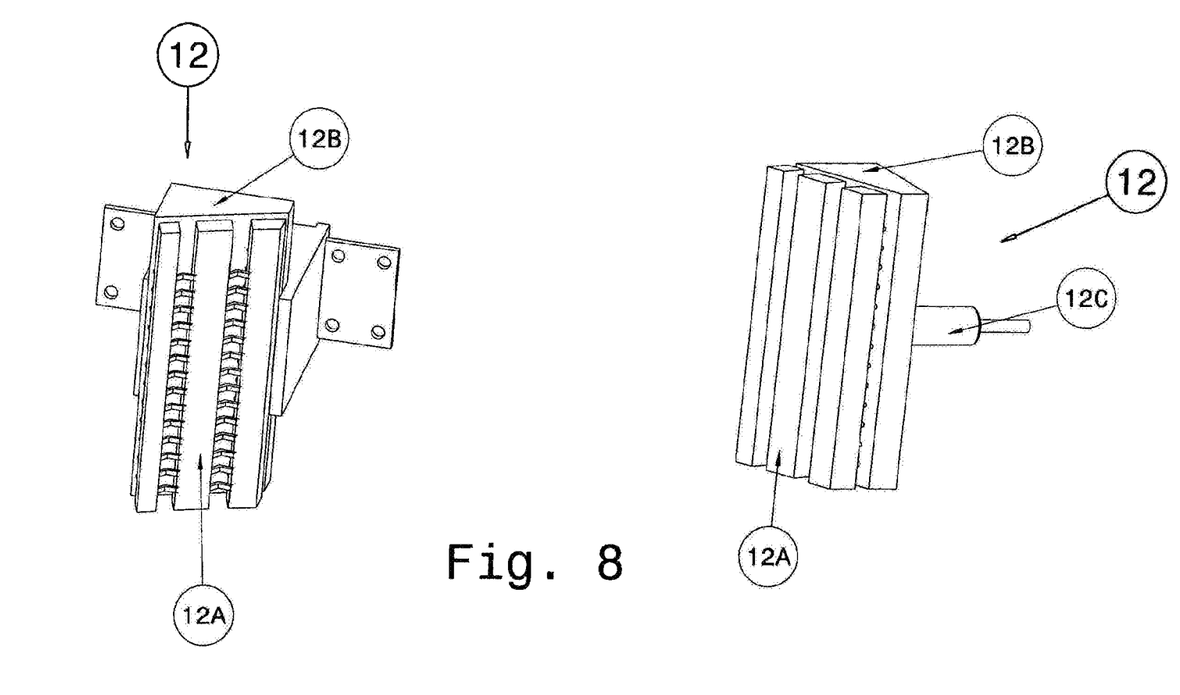
FIG. 8 shows the bearing elements of a load-bearing assembly.

For their part, each of the load-bearing assemblies has bearing elements 12 shown in FIG. 8 and having surfaces 12A that can bear radially inward against the surface of a mast or tower. Prism-shaped bodies 12B form the grip faces 12A and can be pressed from the load-bearing assembly 5 or 6 toward the mast or pulled away from it by an actuator. For this purpose, push rods 12C can be used to which an actuator is coupled.

The movement of the climbing robot occurs such that one of the load-bearing assemblies 5 or 6 on the mast or tower 1 is locked by gripping the bearing elements against the mast through winding-up of the respective belts 9, as a result of which the cross-sectional area defined within the belt 9 is reduced, thus firmly enclosing a mast. After clamping, the other load-bearing assembly is released by unwinding of the respective belt from the respective winding rollers 11 and retraction of the bearing elements 12.

The linear actuator 8 then moves the released load-bearing assembly linearly vertically up or down relative to the fixed load-bearing assembly. Linear actuators 13 that connect the belts 9 of different load-bearing assemblies are also extended or retracted synchronously to the width of motion of the load-bearing assemblies with respect to each other. As a result, the loose belts 9 are held against gravity in a horizontal position and moved along. The linear actuators 13 are preferably only arranged in the cross-sectional halves facing away from the load-bearing assemblies 5 or 6.

The moved load-bearing assembly is then clamped, and the previously clamped one is released and moved along in the same way.

Figure 7:
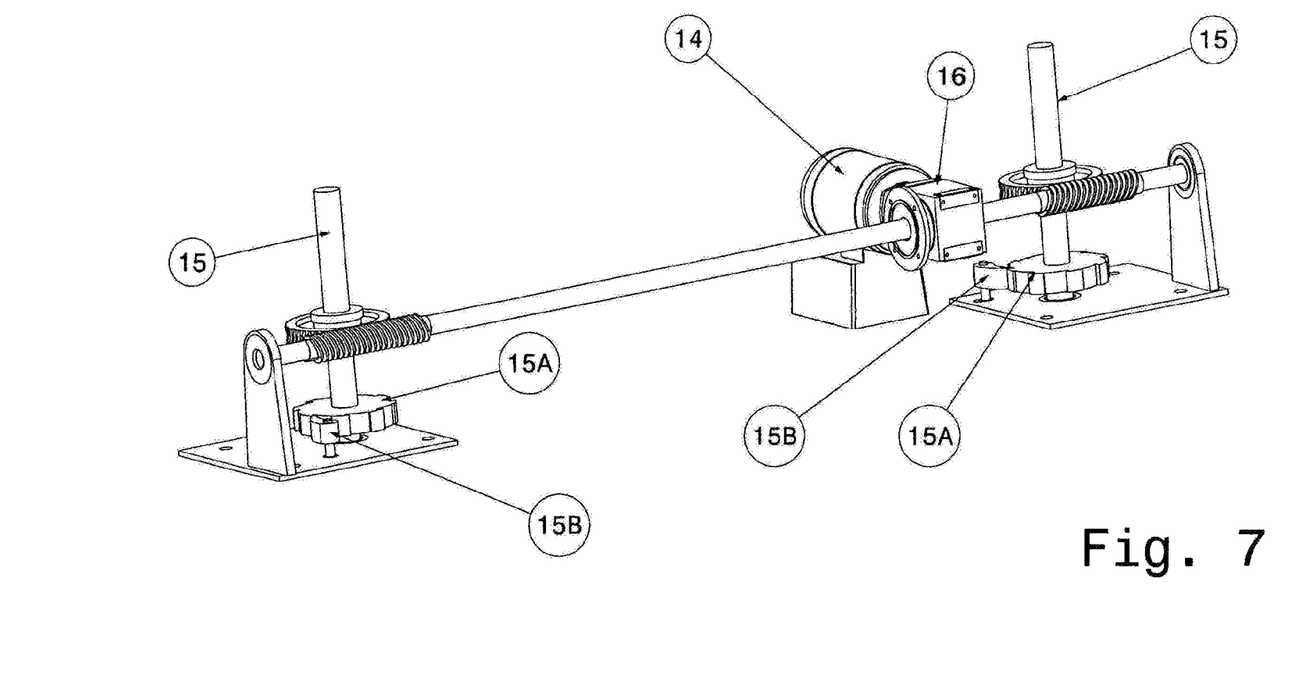
FIG. 7 shows an actuator of a clamp.

FIG. 7 shows one possible mechanism of an actuator of the winding rollers 11. A motor 14 synchronously rotates two winding shafts 15 via a gear unit, or only one of the winding shafts 15 is coupled with the motor by a coupling 16. The winding shafts can have a locking mechanism 15A that only permits rotation one direction of rotation, namely that which brings about a clamping of a belt 9. To release it, a locking element 15B that blocks the reverse rotation of the shaft 15 is disengaged by an actuator (not shown here). In this way, it is ensured that an existing gripping position is not released in the event of a power outage.

Figure 9:
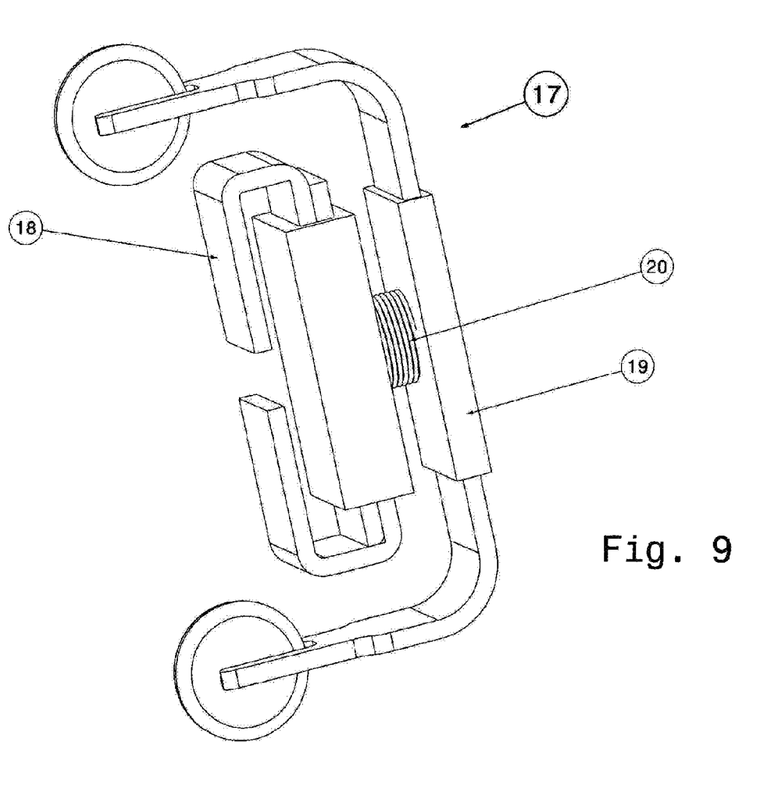
FIG. 9 shows a trolley that can be mounted on belts.

FIG. 9 shows a trolley 17 that is mounted in multiple, equal design on the belt 9, distributed over the periphery of the mast. Part of the belt 9 passes through a slotted retaining sleeve 18. and the sleeve 18 and the belt 9 are attached to a bridge element 19 via a tension spring 20 with the element 19 bridging vertically over the belt 9 and bearing at ends via rollers on the surface of the mast or tower when a load-bearing assembly is moved with the released belt 9.

When the belt 9 is released and the tension therein decreases, it is pulled off the mast surface by the tension spring 20, so that the belt is moved further only by rolling. In contrast, if the tension is increased by winding up the belt with the winding rollers 11, then the belt is pulled against the spring 20 onto the outer surface of the mast or tower and bears firmly against it with the spring 20 being maximally tensioned for the next retraction.

The maintenance dock shown in FIGS. 2 and 3 comprises two dock shells 21A and 21B whose openings face each other. In this embodiment, each dock shell is attached to two support beams 22 (here horizontal, for example) and can be moved in guide rails 23 in two mutually perpendicular directions. The support beams are fastened on the outer corners of the load-bearing assembly parts 5A and 5B. These load-bearing assemblies 5A, 5B, which are connected by guide rails 7 to a single load-bearing assembly 5, can thus form an assembly platform, for example, for the support beams of the maintenance dock that are shown here.

The height of the shells can be adjusted here with the climbing robot, with the spacing from the mast and spacing of the shells 21A and 21B from each other or from a rotor blade 2 being possible by moving the shells 21A and 21B in the rails 23.

The shells 21A and 21B have vertically spaced cutouts 24 at the edges with which the cross section of a vertically hanging rotor blade can be enclosed when the shells are moved together. The remaining residual cross section can optionally be closed by inflating a bladder in the edges of the recesses 24.

Rails 25 are arranged inside the shells 21A and 21B with which a maintenance device 26 can be moved relative to the maintenance object, a rotor blade 2 in this case.

Provision can be made that, using the actuators with which the shells can be moved in the rails 23, the position of the dock shells is automatically stabilized, for example in order to compensate for rotor movements under a wind load. For this purpose, a measuring element that detects the movement of the dock shells can be provided, and the actuators can be controlled on the basis of its signal.

The invention claimed is:

1. A mast-climbing robot comprising:
   a first load-bearing assembly;
   a second load-bearing assembly;
   a linear actuator connected between the assemblies for changing a vertical spacing of the first and second load-bearing assemblies with respect to each other; and
   a respective clamp on each load-bearing assembly that can secure the respective load-bearing assembly on the mast and release the respective load-bearing assembly therefrom, each of the clamps having
   two bearing points on the respective load-bearing assembly,
   a flexible belt between the respective two bearing points and circumferentially around the mast, and
   a clamping actuator with which the length of the respective belt can be increased and decreased between the respective bearing points to tighten the respective belt about the mast and thereby lock the respective assembly on the mast.

2. The climbing robot defined in claim 1, wherein retaining forces are applied by each clamp to the mast by an acting surface of the respective belt determined by a height of the respective belt and a length of contact between the respective belt and the mast and by an area of surface with which the belt of the respective load-bearing assembly bears against the mast.

3. The climbing robot defined claim 1, wherein the clamping actuator is inside the respective load-bearing assembly and the respective belt extends through ports of the respective load-bearing assembly so as to increase or decrease the length of the respective belt outside the load-bearing assembly with the clamping actuator that is inside the assembly.

4. The climbing robot defined claim 3, wherein each belt has inside the respective load-bearing assembly two belt ends upon both of which the respective actuator acts by pulling or pushing or winding up the respective belt.

5. The climbing robot defined in claim 4, wherein each clamp has two of the actuators that on a respective one of the two belt ends or only one of the actuators that acts on both belt ends simultaneously through a switchable coupling.

6. The climbing robot defined in claim 4, wherein the belts are each deflected before the respective belt ends pass over a respective deflection point inside the respective load-bearing assembly.

7. The climbing robot defined in claim 6, wherein the mast is wrapped by each of the belts between the deflection points over more than 300°.

8. The climbing robot defined claim 1, wherein each load-bearing assembly has, on its side facing toward the mast, two bearing elements spaced apart angularly of the mast and that support the respective load-bearing assembly on an outer mast surface when secured by the respective clamp to the mast.

9. The climbing robot defined in claim 8, wherein the bearing elements of each assembly are movable in the respective load-bearing assembly toward and away from the mast surface simultaneously.

10. The climbing robot defined claim 1 wherein at least one of the belts is:
   a link belt with several belt members connected to each other so as to swivel about a vertical axis, or
   a flat belt made of a metal or fiber plastic composite, or
   a textile belt.

11. The climbing robot defined claim 1, further comprising:
   another linear actuator of controllable variable length connected between the belts of the load-bearing assemblies on a side of a mast facing away from the load-bearing assemblies.

12. The climbing robot defined in claim 1, further comprising:
   a plurality of trolleys or sliding carriages distributed along each belt and serving to lift the respective belt from a mast surface when the respective belt is not tensioned by the respective actuator.

13. The climbing robot defined in claim 12, wherein each trolley or sliding carriage has an element that bridges over the respective belt vertically and that has ends that can be or are engaged on a mast surface by rollers or slide blocks, with a side of the bridge element facing toward the mast being connected to the respective belt by a tension spring via a sleeve to which the tension spring is attached and through which the respective belt passes.

14. The climbing robot defined claim 1, wherein one of the load-bearing assemblies has two parts that are vertically spaced from each other, connected to each other, and that each have at least one of the respective clamps, the other of the two load-bearing assemblies being completely between the two parts.

15. The climbing robot defined in claim 14, further comprising:
   vertical rails connecting the two parts of the one load-bearing assembly to each other and on which the other load-bearing assembly is guided.

16. In combination with the climbing robot defined in claim 1, a mobile maintenance dock having:
   a support beam attached to at least one of the assemblies of the mast-climbing robot and
   a first dock shell attached to the support beam and movable thereon in at least two mutually perpendicular directions.

17. The maintenance dock defined in claim 16, wherein the first dock shell has two cut-back ends vertically spaced from each other for receiving a vertically hanging wind turbine rotor blade.

18. The maintenance dock defined in claim 17, further comprising:
   seal elements that can be moved or inflated with a fluid in the cut-back ends and that can fit snugly to the contour of a maintenance object when moved or inflated.

19. The maintenance dock defined in claim 16, wherein the maintenance dock further including a second dock shell, said first and second dock shells are identically shaped dock shells and having openings that face each other horizontally, at least one of the two dock shells being fastened to the support beam so as to be moveable in at least two directions.

20. The maintenance dock defined in claim 16, further comprising:
   a maintenance device movable on multiple axes in the dock shell.

21. The maintenance dock defined in claim 20, wherein the maintenance device can be moved along a surface of a maintenance object by a rail system located on an inner periphery of the dock shell.

* * * * *